June 6, 1967  D. S. GRANT  3,323,440
CORN POPPING APPARATUS
Filed Oct. 7, 1964  2 Sheets-Sheet 1
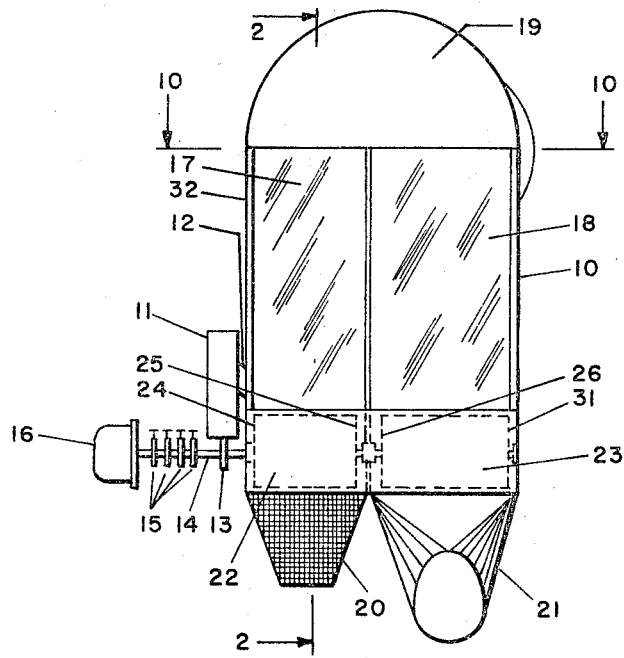
Fig. 1
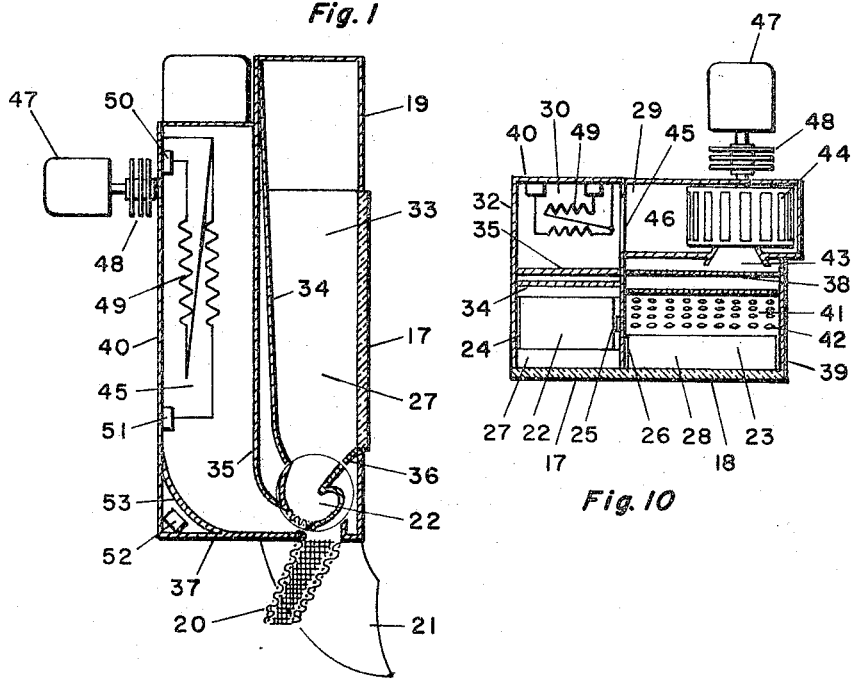
Fig. 2
Fig. 10
INVENTOR.
DON. S. GRANT
BY Ernest Carl Edge June 6, 1967  D. S. GRANT  3,323,440
CORN POPPING APPARATUS Filed Oct. 7, 1964  2 Sheets-Sheet 2

INVENTOR.
DON S. GRANT
BY Ernest Carl Edge

United States Patent Office 3,323,440
Patented June 6, 1967

3,323,440
CORN POPPING APPARATUS
Don S. Grant, 1199 SE. 17th St.,
Fort Lauderdale, Fla. 33300
Filed Oct. 7, 1964, Ser. No. 402,190
7 Claims. (Cl. 99—238.1)

This invention relates in general to an improved corn popping apparatus and in more particularity to a corn popping apparatus in which heated air is utilized to pop the corn.

In the corn popping art today the two most widely known methods of popping are (1) by the use of oil and a heat-transferring pan or kettle, and (2) by the use of hot air passing over the kernels of corn suspended in the stream of air.

In the method using oil the corn is coated with the oil and heat is supplied. The coating of oil tends to distribute the heat evenly over the entire surface of the kernel and as the moisture within the kernel is heated it causes the corn to expand and pop. In these oil-using poppers the heat is usually supplied directly to the bottom surface of a pan or kettle in which the corn is placed. The kettle transfers the heat to the oiled surface of the corn.

Various types of heated air poppers have been proposed and an example is Green Patent Number 2,922,355. In this type of popper no oil is supplied to the corn but instead dry raw popcorn is used. The kernels are suspended in a stream of hot air or other inert gas until enough pressure has been built up within the kernels to make them pop, then the same stream of heated air transports the popped corn to a separate location.

Since each kernel of corn is suspended in the air stream independently of each and every other grain the hot air completely surrounds the kernel and becomes a layer of heat on the entire outer surface of the kernel.

It is a primary object of the invention to provide a corn popping apparatus which keeps the raw corn and the popped corn effectively separated so that raw corn is not carried over accidentally with the popped corn. As the corn is given a spiral motion in the popping chamber the raw and popped corn are separated as soon as a grain is popped. In the vertical tube type of popper the raw and popping corn are intermingled with some of the raw corn in a position above the popped corn and the popped corn will propel the unpopped kernels over the top and out of the popping chamber. My new and novel popping chamber requires that the popped corn decrease in velocity, in comparison to the velocity of the heavier raw corn, in order to escape from the popping chamber. A decrease in velocity will return any unpopped kernels, by gravity, to the popping chamber.

A further object of this invention is to provide a new and improved apparatus for popping corn in which heated air is used as the heating medium and which eliminates the need for the use of oil.

Eliminating the oil also eliminates a goodly number of calories, the presence of which many popcorn eaters are not aware of. When oil is used the popped corn surrounds the oil-covered shell and the consumer does not see the amount of high-caloried oil being eaten.

Elimination of the oil also eliminates a potential fire hazard. Oils commonly used are highly flammable and any overheating of the machine is likely to start a dangerous fire. On the other hand, dry corn will burn if ignited with a flame but does so in the manner that chipboard, etc., burns—the flame is barely self-sustaining and tends to go out unless aided in some manner. Dry corn heated considerably above any temperatures existing in the machine merely shrivels and finally chars, somewhat like burning toast. It is a further object of the invention, therefore, to provide a corn popping apparatus which eliminates any fire hazard caused by the presence of flammable oils.

Heretofore, popcorn venting machines in which a coin is placed, and only enough corn for one serving is popped in response to the coin, have not been practical. If oiled corn is used in this type of unattended machine the oil vapor will cover all of the accessible parts of the machine and in a short while a messy coating of oil is present throughout the machine. Cleaning of the oil layer from the parts of the machine is not an easy task and the longer it goes unattended the harder the oil becomes caked on the surfaces. An object of this invention is to provide a corn popping apparatus which may be readily adapted to a vending machine and which eliminates the need for constant cleaning of oil therefrom.

It is a still further object of the invention to provide a corn popping machine in which the popping cycle is speeded up so as to produce more corn in a given time. According to my invention the corn is brought to the best popping temperature rapidly and the corn is popped in approximately half the time required in a kettle-type popper.

A further object of the invention is to provide a corn popping apparatus in which the popped corn is removed from the heat as soon as it is popped. This eliminates continued heating of the popped corn which has a tendency to dry it out until it is tasteless. By removing it immediately from the heat it remains fresh and tasty when the consumer is ready to eat it.

Due to the fact that each kernel of corn is not touching several other kernels during the heating process, the popped corn has a higher expansion factor than kettle-popped corn. A high expansion factor produces a lighter, tastier product since popped corn tenderness is proportional to expansion. A low expansion factor produces small, tough popcorn.

A further benefit of a high expansion factor is that it produces a maximum bulk product for a minimum volume of corn. This is highly important in the vending machine distribution of popcorn.

A still further object of the invention is to provide a corn popping apparatus which has very little waste. The even, fast heating tends to pop even the most reluctant kernels and the number of old maids is reduced drastically. The only old maids produced are the kernels having fractures or imperfections in the skin which will permit the internal pressure to leak out as fast as it is generated. These imperfect kernels will not pop in any corn popping apparatus and will wind up as old maids.

A further object of the invention is to provide a corn popping apparatus in which the cooking chamber is self-cleaning to remove any old maids that happen to be present. During the delivery cycle of the machine the supply of hot air continues through the cooking chamber for a sufficient time to blow any unpopped kernels or any undelivered popped kernels to the discharge outlet. Then further along in the delivery cycle when the popping chamber is positioned so that the outlet is in complete contact with the discharge outlet another blast of air is shot through the cooking chamber to effect complete cleaning of the device.

A still further object of the invention is to provide a popcorn machine in which the actual popping and the delivery to the temporary storage is visible to the consumer. This provides a certain amount of novelty and entertainment value to the customer and occupies his time during the short waiting for the popping to be accomplished. Most vending machines just stand there in an impersonal manner whereas this popping apparatus when used in a vending machine provides an appreciable amount of visible action.

A further object of the invention is to provide a corn popping apparatus which is relatively safe when placed in unattended locations as a vending machine. By placing a plurality of thermostats in the heater circuit, another thermostat in the air supply passage, and a timed cut-off for the machine if the delivery cycle is not completed within a reasonable time, there is no possible way for the heating elements to get out of control and become a fire hazard even if the plurality of thermostats should all fail at once.

A further object of the invention is to provide a corn popping apparatus which is relatively simple in construction, easy to operate, easy to service, and relatively economical to manufacture.

Further objects, advantages and uses of the invention will be more apparent from the following detailed description, taken in conjunction with the accompanying drawing, in which:

FIGURE 1 is an elevational view of a typical form of my invention;

FIGURE 2 is a cross-sectional view taken substantially on the lines 2—2 of FIGURE 1;

FIGURE 10 is a cross-sectional view of the popper taken substantially on the lines 10—10 of FIGURE 1.

Figure 3:
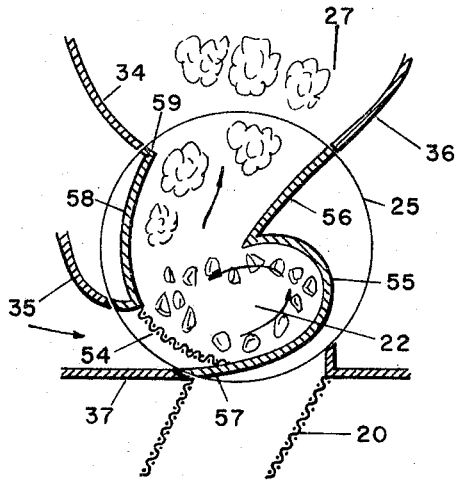
FIGURE 3 is an enlarged fragmentary cross-sectional view of the cooking chamber in the popping or cooking position as shown in FIGURE 2.

Referring now to FIGURE 1, the popping apparatus 10 is shown as comprised of a supply container 11 attached to the main body of the popper 10 and connected thereto by supply line 12. Control cam 13 connected to control shaft 14 is also connected to container 11 to control the feeding of the corn to the popper.

Popper 10 has transparent panels 17 and 18 on the front thereof for viewing of the popping and storing operation. If desired, front casing 19 may also be made of glass or any suitable transparent material.

On the one side of popper 10 is outlet 20 for dispensing old maids and undesirable pieces of corn while alongside outlet 20 is outlet 21 for dispensing the popped corn.

Shown in dotted line in FIGURE 1 is the popping chamber 22 and the storage chamber 23. These two chambers are connected together at their ends and are both operated simultaneously by shaft 14 which is attached to motor 16.

Controls 15 are not a part of the invention and are shown as representative of typical controls for the various cycles of the operation.

Shaft 14 extends into the end plate 24 of popping chamber 22. End plate 25 of popping chamber 22 is connected to end plate 26 of storage chamber 23. End plate 31 forms the opposite end of chamber 23 and is suitably mounted in the side wall to permit simultaneous rotation of the chambers 22 and 23.

As shown in FIGURE 10, the machine is divided basically into four vertical chambers forming four sections 27, 28, 29, and 30 with section 27 as the popping section, 28 as the storage section, 29 as the blower section and 30 as the heater section.

Within the popping section is the popping chamber 22 at the bottom thereof. Transparent wall 17 forms the front of the section while side wall 32, partition 33, and rear wall 34 make up the other three sides. Rear wall 34 is spaced inwardly from partition 35 and curves inwardly at the bottom thereof to give chamber 27 a decreasing cross-sectional area as it approaches the top of popping chamber 22. The purpose of this change in area will be explained in detail subsequently in this specification.

Extending inwardly from front wall 17 is baffle 36 which contacts popper 22 as explained below.

As shown in FIGURE 2, partition 33 does not extend to the top of the machine but stops short so that sections 27 and 28 may be in contact at the top thereof.

Storage section 28 is defined by transparent front wall 18, partition 33, rear wall 38 and side wall 39. At the bottom of section 28 is storage chamber 23 and mounted inside the section 28 is vertical baffle 41 with openings 42 therein. This baffle holds the popped corn in the storage section and permits the heated air to travel through openings 42 in baffle 41 and out through opening 43 in wall 38 to blower 44.

Blower section 29 contains the aforementioned blower 44 and is defined by side wall 39, rear wall 40, partition 45, and partition 46. Mounted outside section 29 is motor 47 which has heat sink 48 on the shaft which connects motor 47 to blower 44.

Heating section 30 is defined by partition 45, rear wall 40, side 32 and partition 35. Mounted within the heating section is heater 49 with thermostats 50 and 51 connected thereto. The bottom of section 30 is shown as curved at 53 in FIGURE 2 to facilitate passing of the heated air to the popping chamber 22. Located outside the curved bottom 53 is thermostat 52.

Figure 4:
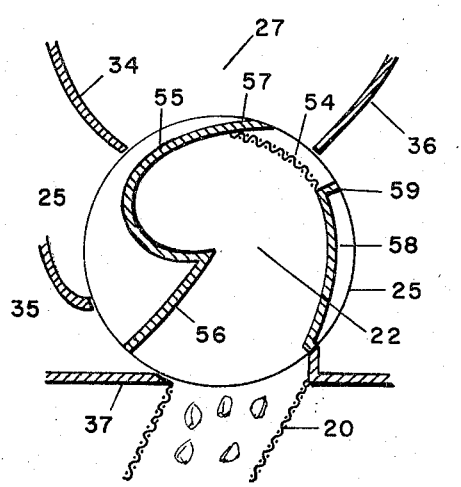
FIGURE 4 is a cross-sectional view of the cooking chamber in an emptying position.

FIGURES 3 and 4 show the popping chamber 22 in greater detail. It is essentially cylindrical in shape and contains end plates 24 and 25. The walls of the chamber 22 are of irregular configuration and have a screened portion 54 which is connected to a first curved solid section 55. Section 55 has a trailing edge section 57 for closing off the outlet 20 when the chamber is in the popping position of FIGURE 3. Connected to curved section 55 is a relatively straight radial section 56. At the opposite side of screen member 54 is a second curved section 58. Sections 56 and 58 are spaced from each other to form an expanding outlet from the popping chamber itself. Wall 36 of section 27 is aligned with section 56 and wall 34 is in contact with the popping chamber by means of baffle 59. Due to this arrangement, walls 34 and 36 define an expanding extension of the outlet located between 56 and 58.

The elements shown in FIGURE 4 are the same as those in FIGURE 3 with the chamber 22 rotated to the position for dumping any unpopped kernels after the popping portion of the cycle has been completed.

Figures 5, 6:
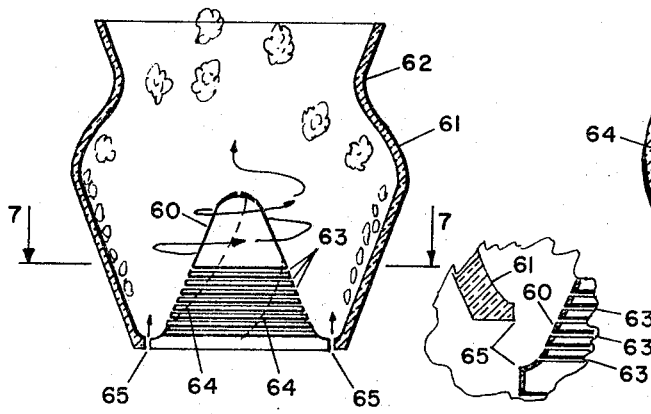
FIGURE 5 is a cross-sectional view of a modified form of cooking or popping chamber.
FIGURE 6 is an enlarged fragmentary view of a section of the popping chamber shown in FIGURE 5 with the outside member raised to permit emptying of the chamber.
Figure 7:
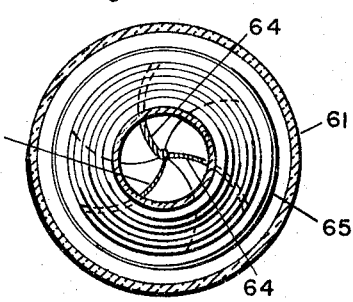
FIGURE 7 is a view taken substantially on the lines 7—7 of FIGURE 5.

FIGURES 5, 6, and 7 show a modified form of the popping chamber. In this embodiment a substantially conical member 60 is placed inside an outer chamber 61 of circular cross-section. Chamber 61 is substantially a cone, reversed in respect to member 60 and is of increasing diameter as one moves upwardly. Near the top of member 61 is a restricted portion 62 described in more detail in the operation of the device set forth below.

Conical member 60 has a plurality of horizontal slots 63 through which heated air is introduced to the chamber inside member 61. The bottom of conical member 60 is connected to a suitable source of heated air similar to the blower and duct arrangement shown in FIGURES 2 and 10. Inside member 60 are a plurality of spiral vanes 64 which give the heated air a swirling motion as it goes through the slots 63.

Member 61 is spaced from member 60 at their respective bases to provide an annular ring 65 for the introduction of air to the lowest point in the popping chamber.

FIGURE 6 illustrates the means for emptying the unpopped corn or old maids from the popping chamber. Member 61 is raised away from member 60 and the unpopped kernels will fall by gravity to a suitable outlet below the popping chamber.

Figures 8, 9:
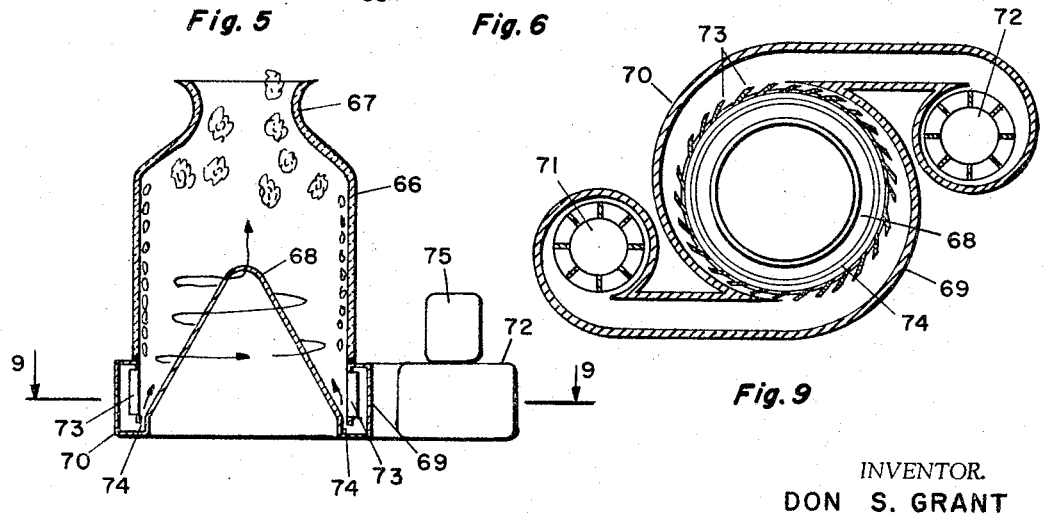
FIGURE 8 is a cross-sectional view of a further modification of the popping chamber.
FIGURE 9 is a cross-sectional view taken substantially on the lines 9—9 of FIGURE 8.

FIGURES 8 and 9 show another modification of the popping chamber. Casing member 66 is substantially cylindrical with a restricted portion 67 near the top thereof. Inside member 66 is a conical member 68 for defining the inside shape of the popping chamber. Around the outside of member 66, at the bottom thereof are manifolds 69 and 70. Connected to manifold 70 is blower 71 with a suitable motor and connected to manifold 69 is blower 72 with motor 75. In the portions of the wall of chamber 66 which are in contact with manifolds 69 and 70 are slanted baffles 73 for giving the heated air a rotating motion as it enters the popping chamber.

Manifolds 69 and 70 are also connected to annular air inlet 74 at the base of cone 68 so that no corn will be caught in this relatively narrow space between members 68 and 66.

Each of the popping chambers illustrated in FIGURES 5 through 9 may be made of transparent heat-withstanding material so that the operator may view the actual popping of the corn inside the popping chamber.

Operation of the device as illustrated in FIGURES 1 through 4 and in FIGURE 10 is as follows: as the cycle is started, corn travels from the corn supply 11 through supply line 12 into the inside of section 27 and falls down into popping chamber 22 where it rests on the screen 54 and curved portion 55 (FIGURE 3).

As blower 44 is started and heater 49 is turned on the air from blower 44 travels across heater 49 and follows walls 53 and 35 of section 27 until it enters the relatively restricted portion between members 35 and bottom 37 (FIGURE 3) and passes through screen 54. Due to the pressure of the heated air it will lift the kernels of corn from their resting place and due to the curvature of member 55 it gives the corn a rotating motion. The kernels will travel along member 55 and the momentum given them by the heated air combined with the density of each kernel itself will cause the kernels to travel around to screen 54 again while the air passes upwardly between members 58 and 56 into section 27. As the kernels reach the screen 54, the entering air will move them along the same path they have just travelled. Each of the several kernels being rotated in the chamber will be independent of each other therefore the individual kernel will be completely surrounded by a layer of heated air.

As a kernel of corn pops its volume is greatly enlarged and its density is decreased so that it will be carried upwardly between the members 58 and 56 by the escaping air.

As noted previously the cross-sectional area of the section between members 58 and 56 and the members 34 and 36 is increased as one travels in an upwardly direction. This means that the volume of air travelling upwardly will increase according to the change in cross-sectional area. As the volume of air increases, the velocity will decrease, thus any unpopped kernels that may have been carried upwardly out of the popping chamber will fall back into the popping chamber due to the fact that the velocity is not strong enough to carry objects of the density of the unpopped corn.

Notice will be taken that due to the fact the air in the popping chamber is rotating the corn around a substantially circular path, a lower air pressure may be used than the pressure needed to suspend the corn in a vertical stream of air. Further, the exact pressure of the air is less critical than in a vertical air popper. In such a vertical air popper the amount of pressure must be exactly enough to suspend the kernels without carrying them beyond the popping area and enough to keep them from falling by gravity back to the bottom of the popper.

As the corn is popped the air carries it upwardly through the section 27, over the top of partition 33, and down into storage section 28. The air passes through the holes 42 in plate 41 and through outlet 43 back to blower 44. As the same air is recirculated through the cycle each time, less energy is required of heater 49 to heat the air.

The corn is stored in section 28 until the popping portion of the cycle is completed. After the popping is finished, chambers 22 and 23 are rotated by shaft 14. As chamber 22 rotates to the position of FIGURE 4, any unpopped kernels will fall through outlet 20 to a suitable disposal area. The blower is still activated during the beginning of this turning of the chamber therefore the air will help remove any kernels stuck in chamber 22.

To further insure cleaning of the chamber, the blower may be reactivated for a short time when the popping chamber reaches the position shown in FIGURE 4. During the rotation of chamber 22, chamber 23 also rotates permitting the popped corn to exit through outlet 21 to a waiting container.

If desired, butter and salt may be added to the corn as it is leaving through spout 21, thus making the complete operation automatic for the customer. If the machine is coin-operated, then insertion of the coin and holding a container for the finished corn are the only actions required by the consumer. During the time between these two actions he is amused and entertained by watching the corn pop by means of the transparent window 17 and watching it being carried over into storage section 28 by means of transparent window 18.

After the popped corn has been dispensed through outlet 21 the popping chamber is rotated to the position of FIGURE 3 which also closes the bottom of the storage chamber and the machine is in readiness for another complete cycle.

Operation of the popping chamber illustrated in FIGURES 5 through 7 is as follows: heated air is introduced up through the bottom of conical member 60. Spiral vanes 64 impart a spiral motion to the air as it passes through horizontal slots 63 into the popping chamber where the corn has been introduced. The heated air will rotate the corn around the wall of the conical member 61 and keep rotating along said wall until it pops. Once it has popped the increased volume of the popped corn will cause the corn to be carried upwardly by the escaping air and will pass through restriction 62. Beyond this point the volume of the air increases thus decreasing the pressure and any unpopped corn will have too great a density to be carried upwardly and will fall back into the popping area. Shoulders at the top of member 61 and at the top of member 66 in FIGURE 8 help to hold the corn in the popping area.

Heated air is also introduced through annular slot 65 at the bottoms of members 60 and 61. This will lift any kernels from the bottom of the channel and cause them to enter the mainstream of rotation.

After the corn is popped, member 61 may be raised as shown in FIGURE 6 and any unpopped kernels will fall out to a suitable disposal area.

In the modification shown in FIGURES 8 and 9, heated air from blowers 71 and 72 is introduced through manifolds 69 and 70 and enters the popping chamber between baffle 73. Due to the tangential position of the manifolds and to the slant of baffles 73 the air enters the chamber with a rotary motion and travels around conical member 68.

The corn travels around the wall of member 66 and as the corn pops it is carried upwardly in the same manner as in the modification shown in FIGURES 5 through 7.

As stated above, the shoulder at the top of member 66 helps keep the corn within the popping area. The radial velocity of the corn keeps it travelling around the inside of the wall of member 66 and in order for the corn to move inwardly it has to overcome the centrifugal force that is generated by this velocity. When it expands after popping the volume is approximately 30 times greater than before and the vertical component in the air stream is sufficient to lift it upwardly even though this is also inwardly, the angle and the air velocity being so adjusted to permit this action.

While only three embodiments of the invention have been shown and described it will be understood by those skilled in the art that the invention is not limited thereto but that various changes may be made in the details without departing from the spirit and scope of the claims following.

What is claimed is:

1. Corn popping apparatus comprising
   (a) a housing,
   (b) a substantially cylindrical popping chamber placed with the longitudinal axis in a horizontal plane within said housing,
   (c) means for introducing corn into said popping chamber,
   (d) an opening in said popping chamber for introducing heated gas into said chamber,
   (e) said opening tangentially disposed relative to the longitudinal axis of said chamber, and
   (f) a storage chamber contiguous to said popping chamber.

2. Corn popping apparatus comprising
   (a) a housing,
   (b) a source of heated gas within said housing,
   (c) a popping chamber near the bottom of said housing,
   (d) said popping chamber being substantially cylindrical,
   (e) said popping chamber placed with the longitudinal axis in a horizontal plane,
   (f) means for introducing dry corn into said popping chamber,
   (g) means for introducing heated gas into said popping chamber in a direction substantially tangential to said chamber,
   (h) the top of said popping chamber having an opening for removal of the popped corn, and
   (i) a storage chamber contiguous to said popping chamber.

3. Corn popping apparatus comprising
   (a) a housing,
   (b) a source of heated gas within said housing,
   (c) a rotatable popping chamber near the bottom of said housing,
   (d) said popping chamber being substantially cylindrical,
   (e) said popping chamber placed with the longitudinal axis in a horizontal plane,
   (f) means for introducing dry corn into said popping chamber,
   (g) a screened section on one side of said popping chamber through which the heated gas is introduced,
   (h) a section of said popping chamber opposite said screened section being open for removal of popped corn,
   (i) an outlet for disposal of unpopped kernels, and
   (j) a storage chamber contiguous to said popping chamber.

4. Corn popping apparatus comprising
   (a) a housing,
   (b) a source of heated gas within said housing,
   (c) a rotatable popping chamber near the bottom of said housing,
   (d) said popping chamber being substantially cylindrical
   (e) said popping chamber having its longitudinal axis placed in a horizontal plane,
   (f) means for introducing dry corn into said popping chamber,
   (g) a screened section on one side of said popping chamber through which the heated gas is introduced,
   (h) an outlet in said popping chamber opposite said screened section,
   (i) said outlet for the popped corn having an increasing cross-sectional area,
   (j) a second chamber of increasing cross-sectional area disposed above said outlet,
   (k) a storage chamber contiguous to said second chamber and in communication therewith,
   (l) an outlet in said housing below said popping chamber for disposing of unpopped kernels, and
   (m) an outlet at the bottom of said storage chamber for dispensing the popped corn.

5. Corn popping apparatus comprising
   (a) a popping chamber of circular cross section,
   (b) said popping chamber disposed with its longitudinal axis in a vertical plane,
   (c) a conical member located inside said popping chamber,
   (d) an opening in said popping chamber for introducing heated gas into said chamber,
   (e) said opening tangentially disposed relative to the longitudinal axis of said chamber,
   (f) a restriction in the upper section of said popping chamber, and
   (g) an outlet for removing the popped corn.

6. Corn popping apparatus comprising,
   (a) a popping chamber of circular cross section,
   (b) said popping chamber disposed with its longitudinal axis in a vertical plane,
   (c) a conical member located inside said popping chamber,
   (d) said conical member having a plurality of horizontal slots therein,
   (e) spiral vanes disposed within the inside of said conical member,
   (f) a source of heated gas attached to the bottom of said conical member,
   (g) a restriction in the upper section of said popping chamber, and
   (h) an outlet for removing the popped corn.

7. Corn popping apparatus comprising
   (a) a popping chamber of circular cross section,
   (b) said popping chamber disposed with its longitudinal axis in a vertical plane,
   (c) an impervious conical member located inside said popping chamber,
   (d) means around the bottom of said popping chamber for introducing heated gas substantially tangential thereto,
   (e) a restriction in the upper section of said popping chamber, and
   (f) an outlet for removing the popped corn.

References Cited

UNITED STATES PATENTS

| | | | |
|---|---|---|---|
| 1,512,323 | 10/1924 | Wallace | 99—238.6 |
| 2,241,754 | 5/1941 | Wilsey | 99—238.1 |
| 2,602,134 | 7/1952 | Nelson | 99—238.1 |
| 2,606,489 | 8/1952 | Morsette | 99—238.6 |
| 2,922,355 | 1/1960 | Green | 99—238.6 |

WALTER A. SCHEEL, *Primary Examiner.*

R. W. JENKINS, *Assistant Examiner.*